United States Patent [19]

Lancaster et al.

[11] Patent Number: 4,795,665
[45] Date of Patent: Jan. 3, 1989

[54] CONTAINERS HAVING INTERNAL BARRIER LAYERS

[75] Inventors: Gerald M. Lancaster, Surfside; Morris S. Edmondson, Alvin, both of Tex.

[73] Assignee: The Dow Chemical Company, Midland, Mich.

[21] Appl. No.: 65,080

[22] Filed: Jun. 17, 1987

Related U.S. Application Data

[63] Continuation of Ser. No. 797,271, Nov. 12, 1985, abandoned, which is a continuation-in-part of Ser. No. 738,007, May 28, 1985, Pat. No. 4,678,713, and a continuation-in-part of Ser. No. 738,009, May 28, 1985, Pat. No. 4,640,865, which is a continuation-in-part of Ser. No. 654,990, Aug. 31, 1984, Pat. No. 4,601,948, which is a continuation-in-part of Ser. No. 531,110, Sep. 12, 1983, Pat. No. 4,600,614.

[51] Int. Cl.$^4$ .................... B65D 65/40; B32B 27/06
[52] U.S. Cl. .................... 428/34.2; 428/246; 428/284; 428/461; 428/463; 428/511; 428/514; 428/34.3; 428/35.3; 428/35.4; 428/35.9; 428/36.1; 428/36.2; 428/36.6; 426/106; 426/126; 426/127

[58] Field of Search .................. 428/35, 511, 514, 520, 428/246, 284, 461, 463

[56] References Cited

U.S. PATENT DOCUMENTS

| | | | |
|---|---|---|---|
| 3,541,033 | 11/1970 | Buttrick et al. | 428/511 |
| 3,617,419 | 11/1971 | Fischer | 428/511 |
| 3,707,343 | 12/1972 | McDonald | 428/511 |
| 3,707,393 | 12/1972 | McDonald | 428/511 |
| 4,300,969 | 11/1981 | Frydendal | 428/514 |
| 4,489,193 | 12/1984 | Goswami | 525/231 |
| 4,513,036 | 4/1985 | Thompson et al. | 428/35 |
| 4,590,126 | 5/1986 | Andersson | 428/511 |
| 4,640,865 | 2/1987 | Lancaster et al. | 428/520 |
| 4,678,713 | 7/1987 | Lancaster et al. | 428/520 |

Primary Examiner—George F. Lesmes
Assistant Examiner—James J. Seidleck
Attorney, Agent, or Firm—Walter J. Lee

[57] ABSTRACT

Containers for foods, juices and beverages containing essential oils or flavorings are comprised of a laminate structrue in which the inner surface of the container, in contact with the foods, juices or beverage, is a halopolymer, such as a vinylidene chloride polymer, which functions as a barrier layer to substantially restrict the passage or migration of the essential oils or flavorings.

51 Claims, 1 Drawing Sheet

CONTAINERS HAVING INTERNAL BARRIER LAYERS

This application is a continuation of Ser. No. 797,271, filed Nov. 12, 1985, now abandoned, which is a continuation-in-part of Ser. No. 738,007, filed May 28, 1985, now U.S. Pat. No. 4,678,713, and a continuation-in-part of Ser. No. 738,009, filed May 28, 1985, now U.S. Pat. No. 4,640,865, which is a a continuation-in-part of Ser. No. 654,990, filed Aug. 31, 1984, now U.S. Pat. No. 4,601,948, which is a continuation-in-part of Ser. No. 531,110, filed Sept. 12, 1983 now U.S. Pat. No. 4,600,614.

FIELD OF THE INVENTION

Containers are constructed of multi-ply materials in which a halopolymer barrier layer comprises the internal surface of the container.

BACKGROUND OF THE INVENTION

There is a perceived need for food containers which have the ability to protect ingredients packaged therein against loss of essential oils and/or flavorings, such as fruit or citrus juices, beverages, and the like. Paperboard coated with polyethylene has been tried for this purpose, but it falls short of providing an acceptable container because polyethylene absorbs, or permits the migration of, an appreciable amount of the essential oils and/or flavorings. The loss of these oils and/or flavorings results in loss of taste and aroma of the juice, such as orange juice.

U.S. Pat. No. 3,120,333, for example, discloses the well-known gable-top milk carton prepared from a laminate of paperboard extrusion-coated on both sides with polyethylene; the polyethylene is employed as a moisture barrier and is in contact with the milk.

U.S. Pat. No. 3,464,546 discloses a multi-layer container for latex and oil based paints wherein the inner layer is an oxygen barrier resin, such as a vinylidene chloride polymer.

U.S. Pat. No. 3,560,227 discloses high barrier coated papers which include, inter alia, the use of a vinylidene chloride polymer sandwiched between two layers of polyethylene which are adhered to a paper base, said to be useful as a barrier for oxygen and water vapor.

The use of polyethylene film as a packaging material is well known, including packages which employ a multi-layer construction wherein the polyethylene is the layer which is in direct contact with packaged ingredients. It has been generally believed that a barrier layer (such as a vinylidene chloride polymer) in a multi-layer construction is effective as a barrier, even though it is not the layer in contact with the packaged ingredients; this belief is well-founded when considering only the barrier properties for oxygen and water vapor. We have found, however, that when a barrier for the essential oils and/or flavorings in juices or beverages is needed, then the halopolymer, such as a polymer of vinylidene chloride, needs to be the layer in direct contact with the juices and beverages in order to be efficient. If there is a layer of polyethylene between the halopolymer and the packaged juices and beverages, then the polyethylene absorbs a significant amount of the essential oils and/or flavorings and having the halopolymer behind the polyethylene does not prevent the absorption into the polyethylene. The loss of essential oils and/or flavorings results in loss of flavor and aroma and the storage time (shelf-life) is considerably shortened if polyethylene is the layer in contact with the juices and/or beverages.

Of importance among the esssential oils and/or flavorings are terpenes. Limonene is a cyclic terpene which can be dextro or laevo; d-limonene is an essential oil found in citrus fruits; it provides at least a large percent of the distinctive flavor and aroma of citrus fruits. Other aroma/flavoring ingredients found in nature's products are included within the meaning of the expression "essential oils and/or flavorings". For instance, vanillin (the aroma and flavor constituent of vanilla bean extract), eugenol (the chief constituent of oil of cloves) and isoeugenol (in nutmeg oil) are among the flavorings added to food products such as baked goods and dry cereals and the like.

A technique has been developed (Journal of The A.O.A.C., Vol. 49, No. 3, 1966, p. 628) which measures the approximate concentration of d-limonene in orange juice as a measure of the essential oils and flavorings. A loss of d-limonene upon storage causes a perceptible change in taste and aroma; this loss of d-limonene and change in taste and aroma is undesirable and should be avoided.

It is an object of this invention to provide a laminate material for making containers for foods, juices and beverages which contain essential oils and/or flavorings. A further object is to provide in such containers an inner-wall barrier layer which substantially prevents migration of essential oils and/or flavorings from foods, juices or beverages stored therein.

SUMMARY OF THE INVENTION

A container for foods, juices or beverages which contain essential oils and/or flavorings that tend to migrate into or through polyethylene are provided with an inner-wall barrier layer of a halopolymer, such as a layer of poly(vinyl chloride/vinylidene chloride). The container is made of a laminate structure comprising a substrate layer (e.g. paper board) bonded to the inner-wall barrier layer, by an adhesive layer between them. The adhesive layer bonds the inner-wall barrier layer to the substrate; beneficially the adhesive layer may be an RF-heatable or MW-heatable polymer, such as a copolymer of ethylene/carbon monoxide (ECO), ethylene/acrylic acid/carbon monoxide (E/AA/CO), or ethylene/vinyl acetate/carbon monoxide (E/VA/CO), and the like. Optionally there may be an outer wall layer on the substrate which may be the same material as the said adhesive layer if desired. The halopolymer barrier may be the innerwall of a large variety of laminate structures which include a substrate layer. The "substrate" may, itself, be a multi-layer laminate having a main layer and one or more auxiliary or filler layers.

DESCRIPTION OF THE DRAWINGS

The figures are provided as visual aids (though not to scale) for use in generally describing the laminates.

DETAILED DESCRIPTIONS OF THE INVENTION

In the figures the general functions of the layers are shown by letters (defined below), the cross-hatching being used to visually distinguish different layers, not to specify a particular material.

Figure 1:
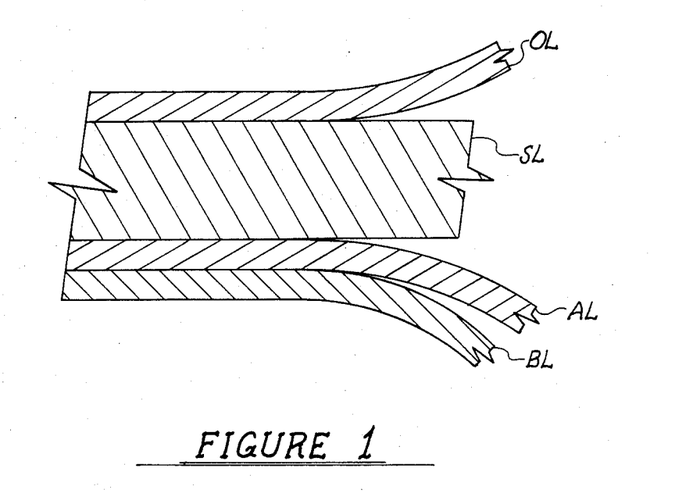
FIG. 1 shows a laminate for forming a container according to the invention.
Figure 2:
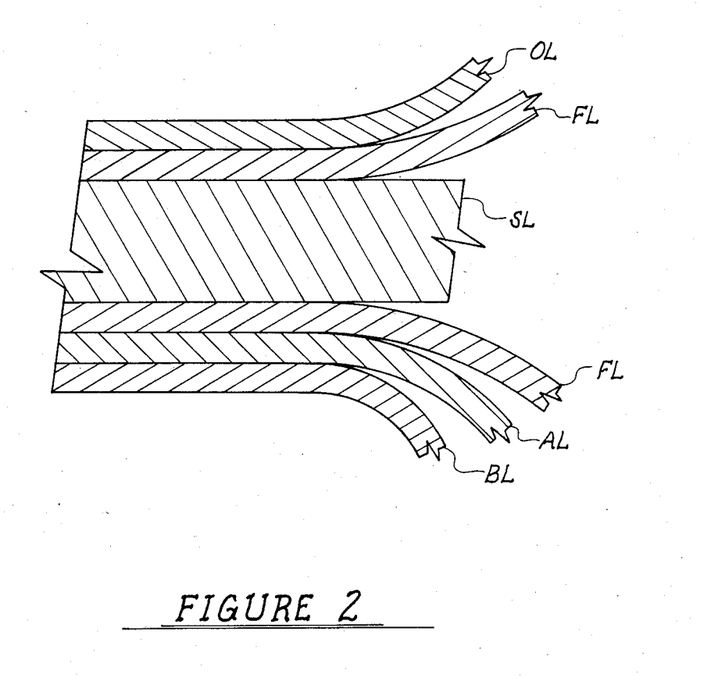
FIG. 2 shows an additional laminate for forming a container according to the invention.

FIG. 1 illustrates a portion of a substrate layer (SL), an adhesive layer (AL), and a barrier layer (BL); an optional outer layer (OL) is also shown. The barrier layer comprises the inner-wall or inner-surface of a container made from such a laminate. FIG. 2 illustrates a portion of a substrate layer (SL), between two auxiliary or filler layers (FL), with an adhesive layer (AL) holding the halopolymer barrier layer (BL) in place as the inner-wall layer, and an outer layer, are, independently, optional, depending on the result desired in the total laminate. The plies (layers) of the laminate structure are shown as partially peeled apart for illustration purposes. Various combinations of layers may be included in the laminate structure, if desired, such as described below:

1. outer layer/filler layer/substrate layer/adhesive layer/barrier layer;
2. outer layer/filler layer/substrate layer/filler layer/adhesive layer/barrier layer;
3. outer layer/substrate layer/filler layer/adhesive layer/barrier layer.
4. Substrate layer/adhesive layer/barrier layer;
5. substrate layer/filler layer/adhesive layer/barrier layer.
6. Outer layer/substrate layer/adhesive layer/barrier layer.

In FIG. 2, the FL/SL/FL portion may represent the "substrate" layer as a laminate having a main layer (the "SL") bonded on each surface to an auxiliary or filler layer (FL) or the FL/SL portion may be considered as the "substrate" layer as a laminate having a main layer (SL) bonded on one surface to an auxiliary or filler layer (FL). Likewise, in FIG. 1, one may consider the substrate layer (SL) to, itself, be a multi-layer laminate having a main layer and one or more auxiliary or filler layers.

As used herein "a polymer of ethylene" means that the polymer is predominantly ethylene, but may contain significant amounts of copolymerizable monomers. Likewise "a polymer of vinyl chloride or vinylidene chloride" or any other monomer, means that a polymer contains predominantly that named monomer. Somewhat similar expressions, e.g., "olefin polymers", "vinyl polymers" and the like can include copolymers as well as homopolymers. A homopolymer of vinylidene chloride is usually too brittle at low temperatures, and too unstable at melt temperature, so vinylidene chloride is usually copolymerized with at least a minor amount of at least one other monomer.

One or more "auxiliary" or "filler" layers (FL) may be used, if desired, in order to impart various features to the laminate, such as strength, rigidity, weight, color, thickness, appearance, printability, opacity, barrier properties, processibility, toughness, reduced costs and the like. Filler layers may comprise, e.g., an olefin or vinyl polymer or copolymer, such as LDPE, HDPE, LLDPE, EVA, EAA, polypropylene, styrene copolymers, or other polymers or resins such as polycarbonate, polyester, polyamide, halopolymers, PET, PTFE, PVC, PVDC, epoxies, urethanes, and the like, including those that have been compounded with colorants, dyes, additives, pigments, dispersed solids, and the like. Such materials may also serve as the outer layer, if desired. The laminates may include both thermoplastic layers and thermosetting layers.

The containers may be in the form of cartons, (such as those in common usage for milk and beverages), boxes, bags, envelopes, tubes, and the like. Closing of the containers may be done by using an adhesive or by conventional heat-sealing, such as hot air, hot bars, radiant heat and the like. Containers closed by a lid or cap are also within the ambit of the present invention; also containers which employ a sealing strip or friction closure are included.

One has the option, in those embodiments which employ layers of ethylene polymers containing copolymerized moieties of carbon monoxide, of heat-sealing by using high frequency (especially microwave frequency) energy whereby heat is generated from within the laminate, rather than rely on heat-transfer through the layers of topically-applied heat. The package or carton should be held under at least slight compression at the desired area of adhesion to cause the heated thermoplastic to weld in that area. The term "RF-heatable" refers to the ability to become heated by the action of radio frequencies; microwave frequencies are high frequency radio frequencies.

It has been determined that E/CO/acrylic acid terpolymers are especially useful as heat-plastified adhesives between layers of similar plastics or resins, layers of dissimilar plastics or resins, and/or between layers of plastics or resins and completely different substrates, such as paper, cloth, metal, glass, vitreous material, wood, leather. These terpolymers are also useful as heat-plastified adhesives between layers of solid materials, neither layer being plastic or resin.

Particularly useful laminates are those wherein a CO-containing heteropolymer, especially an E/CO, E/CO/VA, E/CO/MAA, or E/CO/AA polymer, is employed as an RF-sealable layer laminated, or otherwise adhered, to a barrier film of a chloropolymer such as polyvinyl halide, polyvinylidene halide, copolymers of polyvinyl halide and polyvinylidene halide, chlorinated polyolefins, chlorinated polyethylene, and the like. The amount of CO groups in the heteropolymers should be in the range of about 0.1 to about 50% by weight, preferably about 1 to about 40% by weight, most preferably about 5 to about 30% by weight. Layers of other materials may be used as plies of a multi-layered structure which include the chloropolymer barrier layer on a CO-containing polymer, especially an E/CO, E/CO/VA, E/CO/MAA, or E/CO/AA polymer RF-sealable layer, including those where the E/CO, E/CO/VA, E/CO/MAA, or E/CO/AA polymer is co-extruded with other polymers. The chloropolymer may be extruded onto the E/CO, E/CO/VA, E/CO/MAA, or E/CO/AA polymer layer, or may be co-extruded with the E/CO, E/CO/VA, E/CO/MAA, or E/CO/AA polymer or may be applied as a fine-particle aqueous disperion, such as a latex, or as a solution, thereby forming a thin film on the E/CO, E/CO/VA, E/CO/MAA, or E/CO/AA. The barrier properties needed for many packages are those wherein essential oils and/or flavorings, such as d-limonene, in juices or beverages are substantially prevented from passing through, or migrating from, the packages by the use of a barrier layer in contact with the juice. A chloropolymer is found to have good barrier properties for such oils and flavorings.

Thin layers of chloropolymers alone are likely to emit heat about as fast as it is generated by RF-energy, thus thin layers are not efficiently brought to a heat-plastified condition well enough to obtain a good seal, even though thin layers of the chloropolymers provide good barrier properties for the heat-sealable CO-containing polymer. However, the RF-active CO-containing polymer can heat not only itself, but also the chloropolymer, or any other layer which is in contact with it.

The chloropolymers may also contain other copolymerized monomer moieties, such as acrylate, methacrylate, acrylonitrile, and the like, such as: poly(vinylidene chloride)/vinyl chloride; poly(vinylidene chloride)/acrylonitrile; poly(vinylidene chloride)/acrylate; poly(vinylidene chloride)/alkyl methacrylate; poly(vinylidene chloride)/methyl methacrylate; and terpolymers of these.

Examples of latexes (aqueous fine dispersions) of, e.g., polyvinylidene chloride and/or polyvinyl chloride which are suitable for use in this invention generally have solids contents in the range of 10–90 wt.%, preferably about 30 to about 75 wt.% and generally contain surfactants, stabilizers, and/or surface tension modifiers, and generally have surface tensions in the range of about 30 to 90 dynes/cm, preferably about 40 to 80 dynes/cm, when measured at 23° C.

Latexes available commercially as SARAN* latexes (*a product of The Dow Chemical Company) may be used, such as, SL112, SL116, SL118, SL143, and SL159, all of which are latexes comprising vinylidene chloride polymers which are commercially available.

Application of the chloropolymer to the E/CO, E/CO/VA, E/CO/MAA, and E/CO/AA films, when applied as a latex (fine-particle aqueous dispersion), is appreciably improved by first treating the CO-containing film surface with a corona discharge which improves its wettability. This corona treatment "cleans" the film surface, increases the polarity of the surface, and modifies the surface tension of the film surface. Corona treatment is provided by using, e.g., a commercially available apparatus, Model RS-96 Surface Treater from ENI Power Systems Inc. Treating levels of about 0.1 to about 20 watts/ft.$^2$/min.(1.08 watts/m$^2$/min. to 215 watts/m$^2$/min.), preferably about 2–10 watts/ft.$^2$/min.(21.5 watts/m$^2$/min. to about 108 watts/m$^2$/min.) may be used. Above about 20 watts/ft.$^2$/min. (215 watts/m$^2$/min.), one may encounter excessive polymer degradation. Corona treatment can also be used to surface treat other polymers to improve their bonding to other layers.

The latex may be applied to the film by spraying, brushing, or spreading, using a doctor blade or other device, if needed, to attain the desired thickness, allowing for evaporation of the aqueous carrier. One type of spreader which functions as a "doctor blade" which has been commonly used for many years in the art of laying down coatings on a substrate, is a Mayer* rod (*a trademark) which is a round rod wrapped with wire; these come in different sizes commensurate with the desired thickness of the fluid latex to be applied. One may use a direct gravier, a flexographic, offset gravier, or trailing blade coater to apply the latex. The latex is then dried, especially to about 20° C. to about 150° C.

The thickness of each layer in the laminate structure can range from very thin layers of, e.g., a thickness in the range of about 0.00005 inch (0.000127 cm) to about 0.005 inch (0.0127 cm) to relatively thick layers of, e.g., about 1 mm to about 2 mm or more, depending on the properties and stiffness desired of that layer. Generally the "substrate layer" is relatively thicker than the barrier layer, adhesive layer, or other layers and it largely contributes to the rigidity or flexibility; this includes substrate layers which comprise a main layer laminate to at least one layer of an auxiliary or filler layer.

While there are many possible laminates which may comprise or contain a CO-containing polymer with a coating of halopolymer barrier layer on it, a few examples are:

| | | | |
|---|---|---|---|
| halo-polymer | halo-polymer | halo-polymer | halo-polymer |
| CO-polymer | CO-polymer | CO-polymer | CO-polymer |
| substrate | internal barrier | internal barrier | printed substrate |
| filler layer | substrate | substrate | halo-polymer |
| outer layer | filler layer | adhesive | |
| | polyolefin | paper | |
| halo-polymer | | polyolefin | halo-polymer |
| CO-polymer | halo-polymer | print | CO-polymer |
| substrate | CO-polymer | polyolefin | polycarbonate |
| polystyrene | substrate | | |
| | filler-layer | halo-polymer | |
| halo-polymer | | CO-polymer | |
| CO-polymer | | substrate | halo-polymer |
| filler-layer | | CO-polymer | CO-polymer |
| filler-layer | | | substrate |
| substrate | | halo-polymer | |
| filler-layer | | CO-polymer | |
| outer-layer | | substrate | |
| | | adhesive | |

In the foregoing examples of layered structures the meaning of the terms used in describing the layers include:

halo-polymer—a thermoplastic organic polymer which contains sufficient halogen groups to provide barrier properties to substantially inhibit or prevent the passage of essential oils and/or flavorings, such as d-limonene; preferably these are polymers principally based on vinyl halide or vinylidene halide, where the halide is chloride or fluoride, or a mixture, most preferably chloride;

CO-polymer—a thermoplastic organic heteropolymer, e.g. an olefin polymer, having carbon monoxide units along the polymer chain, preferably E/CO, E/CO/VA, E/CO/MAA, or E/CO/AA, most preferably E/CO or E/CO/AA;

adhesive—may be a CO-polymer as described above or may be a thermoplastic (such as an acrylic, olefin, or vinyl polymer) or thermosetting polymer or resin (such as a urethane or epoxy) which may be used in providing adhesion of one layer to another, if needed; the adhesion layer should be one having a solubility parameter in the range of about 8 to about 14, esp. about 8.5 to about 13; outside that range the adhesive layer may tend to delaminate from the halopolymer barrier layer when used in enclosing a liquid for extended periods of time of, say, 2 weeks or more. The solubility parameters are expressed in Hildebrand units and can be determined by the method published by P. A. Small, Journal of Applied Chemistry, 3 71 (1953) or can be determined by the method published by K. W. Suh and J. M. Corbett, Polymer Preprint A.C.S., Div. IV, Vol. 9, #1. 732–41 (1968).

internal barrier—this may be a second halo-polymer layer as described above, or may be another material which has desired $O_2$ or $H_2O$ barrier properties, such as polyvinylalcohol, metal foil, nylon, polychlorofluoroethylene, polyethylene terephthalate, polytetrafluoroethylene, polyethylene/vinyl alcohol copolymer, acrylonitrile polymers and copolymers, and the like;

filler layer—this may comprise an olefin polymer, vinyl polymer, or copolymer, such as LDPE, HDPE, LLDPE, EVA, EAA, polypropylene, polyester, polyamide, halopolymer, PET, PTFE, PVC, PVDC, and the like, including those that have been compounded with colorants, dyes, additives, pigments, dispersed solids, and the like. Such materials may also serve as the outer layer if desired, and in appropriate circumstances may serve as an internal barrier. Or it may be a material such as identified herein as a barrier layer.

outer-layer—this may be, e.g., a thermoplastic polymer, a thermosetting resin, a halopolymer, an olefin polymer, a vinyl polymer, a CO-polymer, a polyester, a polyamide, a metal foil, paper, or may be the same material as used as a barrier layer, a filler layer, an adhesive layer, or as the substrate.

paper—this may be, e.g., Kraft paper or paperboard or other pressed fibrous material and the like, such as those prepared in a Fourdrinier process;

print—this may be, e.g., any printed matter, such as words, numbers, logos, designs, etc. which may be printed on at least one ply of a laminate;

substrate—this may be, e.g., a layer of natural material, such as cloth, cellulosic-based, wood fiber product, metal, ceramic, or refractory material, or may be a synthetic material such as thermoplastic or thermosetting materials or polymeric condensates, including sintered, woven, non-woven, cast, foamed, or fused materials; this includes, inter alia, HDPE, LLDPE, LDPE, polycarbonate, halopolymers, polypropylene, other polyolefins, polyacrylates, vinyl polymers, epoxides, urethanes, and the like.

Some of the solubility parameters of polymers, calculated and observed, published by P. A. Small (see supra) are as follows:

| Polymer | Calc. | Obs. |
|---|---|---|
| Polyisobutylene | 7.70 | 8.05 |
| Polythene | 8.1 | 7.9 |
| Natural rubber | 8.15 | 7.9–8.35 |
| Polybutadiene | 8.38 | 8.4–8.6 |
| Butadiene/Styrene: | | |
| 85:15 | 8.48 | 8.5 |
| 75:15 | 8.54 | 8.09–8.6 |
| 60:40 | 8.65 | 8.67 |
| Polystyrene | 9.12 | 8.6–9.7 |
| Polystyrene/divinylbenzene | | 9.1 |
| Buna N (butadiene 75:acrylonitrile 25) | | 9.5 |
| Polymethyl methacylate | 9.25 | 9–9.5 |
| Neoprene GN | 9.38 | 8.18–9.25 |
| Polyvinyl acetate | 9.4 | |
| Polyvinyl chloride | 9.55 | 9.48–9.7 |
| Polyvinyl bromide | 9.6 | 9.5 |
| Polymethyl chloroacrylate | 10.1 | |
| Cellulose dinitrate | 10.48 | 10.56 |
| Polyglycol terephthalate | 10.7 | |
| Polymethacrylonitrile | 10.7 | |
| Cellulose diacetate | 11.35 | 10.9 |
| Polyacrylonitrile | 12.75 | |

As mentioned supra, the adhesive layer is preferably an olefin heteropolymer or copolymer with carbon monoxide copolymerized into the polymer chain during the polymerization process. These polymers exhibit very good adhesion to halo-polymers such as VDC polymers and the like. Such CO-containing polymers are heat-sealable by conventional methods and also are sealable by radio frequency (RF) energy, and even microwave (MW) energy. This is particularly beneficial when such type of sealing is desired in a packaging production line in which sealing by topically-applied heat is not practical or is not as efficient. While preferably the CO-containing hetero-polymers are copolymers of ethylene/carbon monoxide (E/CO), ethylene/acrylic acid/carbon monoxide (E/AA/CO), ethylene/methacrylic acid/carbon monoxide (E/MAA/CO), ethylene/vinyl acetate/carbon monoxide (E/VA/CO), one may also use others, e.g., ethylene/ethyl acrylate/carbon monoxide (E/EA/CO), ethylene/methyl acrylate/carbon monoxide (E/MA/CO), ethylene/methyl methacrylate/carbon monoxide (E/MMA/CO), ethylene/ethyl methacrylate/carbon monoxide (E/EMA/CO), and the like.

The substrate may be, e.g., a flexible semi-rigid, or rigid material such as paper, paper-board, polyethylene, metal, polyamide, an acrylate polymer, a vinyl polymer, polyethyleneterephthalate, fiberglass mat or cloth, polyurethane, polyester, polyepoxide a styrene polymer, a cellular polymer or resin, or wood fiber products, depending on the configuration and rigidity desired in the final laminate structure and the container constructed thereof. It will be understood that the more plies or layers of materials there are in the laminate the stiffer it becomes.

The outer layer may be of the same material as used in a filler layer, barrier layer or barrier coating or as an adhesive layer, or may be different. Generally the outer layer is used for esthetic purposes, for scuff-resistance, for heat-sealability, for handling, for marketing, for printability, for insulation, for protection of the substrate or coated substrate, or as a barrier against outside contamination, oxygen or moisture. Also an outside layer may be used to improve the physical strength, rigidity, or dimensional stability of the container.

The laminates may be prepared in accordance with known techniques by bringing together the respective layers and causing them to form an adhered multi-ply material which is then fashioned into the desired configuration for use as a container. Or some or all of the layers may be co-extruded into a multi-ply laminate form. The techniques for making laminates and containers are known to skilled artisans.

The barrier layer, while it may be applied by a melt-extrusion step or as a solution-coating, is beneficially applied as a film-forming latex-type (very fine particle particle aqueous dispersion), such as when a Saran* latex (*product of the Dow Chemical Company) is spread onto the substrate, or onto an adhesive layer or filler layer, then dried into a thin film. By using such a latex there is generally less tendency for pin-holes to be formed, in comparison to the same thickness of film when melt-extruded. Most preferably, two thin layers of latex are applied as an added safeguard against pin-holes. If a barrier layer of, say, 0.01 mm thickness is desired, it is better to apply two layers of 0.005 mm each.

The following examples are given to illustrate certain embodiments of the invention, but the invention is not limited to the embodiments shown.

In the Examples which follow, not all orange juice samples started with the same concentration of d-limonene. Unless stated otherwise, all paper layers were bleached Kraft paper of 25 lbs. per ream (3000 ft.$^2$) or about 0.041 kg/m$^2$.

EXAMPLE 1

Test packets were made in which laminates (6"×9" or 15.24 cm×22.86 cm) were folded into envelope or bag shapes and thermally sealed about 1.3 to 2 cm from the edges to enclose 50 cc of orange juice. These packets were stored at 40° F. (4.4° C.) and sampled at intervals to analyze the concentration of d-limonene. Control samples were stored in a glass containers at the same temperature. In Table I below, Laminate A was bleached Kraft paper (25#/ream) coated with 1 mil (0.0254 mm) of an adhesive, viz., ethylene/carbon monoxide copolymer (E/CO) which contained 10% CO in the polymer; this Laminate A is for comparison purposes. Laminate B is an example of the present invention and is the same as Laminate A except that it is coated with 2 layers of Saran* 112 latex (a vinylidene chloride polymer) to a thickness of about 0.2 mil (0.005 mm). There is some experimental error in the test used for measuring d-limonene, but each measurement is believed to be accurate to about ±5 percentage points of the measured value. As can be seen from the data, there is virtually no difference in loss of d-limonene between the glass control and Laminate B.

TABLE I

| Days at 4.4° C. | Parts Per Million (ppm) of d-Limonene | | |
|---|---|---|---|
| | Glass (control)* | Laminate A (control)* | Laminate B (barrier layer) |
| 0 | 126 | 126 | 126 |
| 0.5 | 126 | 110 | 119 |
| 1 | 116 | 53 | 114 |
| 2 | 119 | 47 | 113 |
| 5 | 114 | 30 | 110 |
| 7 | 119 | 19 | 114 |
| 9 | 119 | 15 | 115 |
| 14 | 110 | 4 | 109 |

*not examples of invention.

EXAMPLE 2

In test packets prepared substantially in accordance with the procedure of Example 1, the following laminates were tested, with Laminates C and D being illustrations of the present invention. The paper used in the following described laminates was the same kind of paper as in Example 1.

Laminate A—paper coated with 1 mil (0.0254 mm) LDPE.
Laminate B—paper coated with 1 mil (0.0254 mm) E/CO.
Laminate C—Laminate B coated with single 0.0025 mm layer of Saran* 112 latex.
Laminate D—Laminate B coated with two layers of 0.0025 mm each of Saran* 112 latex

TABLE II

| Days at 4.4° C. | Parts Per Million (ppm) of d-Limonene | | | |
|---|---|---|---|---|
| | A** | B** | C | D |
| 0 | 122 | 122 | 122 | 122 |
| 0.5 | 98 | 100 | 120 | 122 |
| 2 | 48 | 52 | 119 | 119 |
| 3 | 45 | 47 | 119 | 118 |
| 4 | 43 | 46 | 119 | 119 |
| 7 | 30 | 29 | 118 | 118 |

**Control runs, not invention.

Laminate C gave such efficient d-limonene retention (aroma retention) that an additional layer (D) of the barrier coating provided no substantial change during this short test period, but in a more extended test period the double-coat would be expected to assure continued efficiency.

EXAMPLE 3

Substantially as in Example 1, the following laminates were made into test packets and tested for d-limonene retention. The paper was the same as in Example 1.

Laminate A—paper coated with LDPE (0.025 mm).
Laminate B—paper coated with E/CO adhesive (0.0254 mm) and a single barrier coat of Saran* 159 latex of 0.00254 mm.
Laminate C—paper coated with E/CO adhesive (0.0254 mm) and a single barrier coat of Saran* 112 latex of 0.00254 mm.
Laminate D—paper coated with E/CO adhesive (0.0254 mm) and a double coat of Saran* 112 latex of 0.005 mm.
Laminate E—paper/0.0254 mm LDPE/Al foil/0.0254 mm LDPE.
Laminate F—commercially availabe Saranex* S-11 barrier film comprising a co-extrusion of a Saran* polymer encased in LDPE skins.

TABLE III

| Days at 4.4° C. | Parts Per Million (ppm) of d-Limonene | | | | | |
|---|---|---|---|---|---|---|
| | A** | B | C | D | E** | F** |
| 0 | 113 | 113 | 113 | 113 | 113 | 113 |
| 0.5 | 65 | 114 | 110 | 110 | 63 | 56 |
| 1 | 55 | 110 | 112 | 113 | 54 | 53 |
| 3 | 32 | 108 | 105 | 110 | 34 | 44 |
| 4 | 23 | 110 | 108 | 113 | 40 | 40 |
| 7 | 23 | 106 | 100 | 109 | 29 | 39 |
| 11 | 12 | 100 | 87 | 107 | 28 | 31 |

**Control runs, not invention.

It is found that if the barrier material is not the inner-wall layer as in Laminates E and F, then its barrier properties are not effectively realized from aroma retention as measured by d-limonene retention. In Laminate F (also A and E) LDPE is the inner-wall layer and is not a good barrier.

EXAMPLE 4

Another set of packets were tested of the following laminates:

Laminate A—paper coated with E/CO layer, 0.0254 mm.
Laminate B—Laminate A coated with single coat (0.00254 mm) of Saran* 112 latex.
Laminate C—Laminate A double-coated (0.005 mm) with Saran* 112 latex.
Laminate D—paper coated with 0.025 mm EVA (18% VA)
Laminate E—Laminate D coated with 0.0025 mm Saran* 112 latex.
Laminate F—Laminate D coated with double-coat (0.005 mm) of Saran* 112 latex.

TABLE IV

| Days at 4.4° C. | Parts Per Million (ppm) of d-Limonene | | | | | |
|---|---|---|---|---|---|---|
| | A** | B | C | D** | E | F |
| 0 | 146 | 146 | 146 | 146 | 146 | 146 |
| 0.5 | 126 | 152 | 151 | 119 | 146 | 148 |
| 1 | 88 | 152 | 151 | 84 | 141 | 140 |
| 3 | 51 | 150 | 150 | 46 | 130 | 134 |
| 6 | 28 | 144 | 148 | 24 | 110 | 112 |
| 9 | 16 | 141 | 148 | 16 | 95 | 112 |
| 14 | 12 | 138 | 148 | 8 | 91 | 83 |

**Control runs, not invention.

EXAMPLE 5

Test packets were made and tested of the following laminates.

Laminate A—paper coated with 0.025 mm E/CO and double-coated (0.005 mm) with Saran* 112 latex.

Laminate B—paper extrusion-laminated to vinylidene chloride polymer (Saran Wrap* film) (0.01 mm), using 0.025 mm E/CO as adhesive layer.

TABLE V

| Days at | Parts Per Million (ppm) of d-Limonene | |
| 4.4° C. | A | B |
| --- | --- | --- |
| 0 | 131 | 131 |
| 1 | 132 | 131 |
| 2 | 132 | 127 |
| 3 | 132 | 130 |
| 6 | 134 | 129 |
| 8 | 133 | 126 |
| 9 | 134 | 126 |
| 13 | 134 | 127 |

This example compares an extrusion-laminated barrier layer with a latex-applied barrier coating; both are effective.

EXAMPLE 6

Further test packets were made using the following structures:

Structure A—paper coated with 0.025 mm E/CO and double-coated with Saran* 112 latex (0.005 mm).

Structure B—film of polypropylene (0.025 mm).

Structure C—a 0.025 film prepared from a 64/30/6 blend by wt, respectively, of Saran* film polymer, LDPE, and a compatibilizer.

Structure D—same as C, except used HDPE instead of LDPE.

TABLE VI

| Days at | Parts Per Million (ppm) of d-Limonene | | | |
| 4.4° C. | A | B** | C | D |
| --- | --- | --- | --- | --- |
| 0 | 158 | 158 | 158 | 158 |
| 0.5 | 158 | 114 | 135 | 144 |
| 1 | 156 | 84 | 122 | 134 |
| 2 | 158 | 59 | 112 | 126 |
| 5 | 159 | 32 | 98 | 116 |
| 8 | 160 | 13 | 82 | 110 |

**Control run, not invention.

This shows that the barrier property of the halopolymer barrier layer is substantially retained, even when mixed (i.e. diluted) with polyethylene. Also it shows that polypropylene makes a poor barrier for d-limonene.

We claim:

1. A container for enclosing foods, juices or beverages which contain essential oils and/or flavorings, said container being constructed of a multi-ply structure comprising a substrate, an inner-wall barrier layer, and an adhesive layer between, and binding, said substrate and said barrier layer,
said adhesive layer consisting essentially of a RF-heatable polymer of ethylene having carbon monoxide polymerized into the polymer chain, including those containing a minor amount of another copolymerizable olefin or vinyl compound EVACO, such adhesive layer having a solubility parameter in the range of about 8 to about 14, and said barrier layer comprising a chloropolymer which restricts or substantially retards the passage or migration of the essential oils and/or flavorings from foods, juices or beverages enclosed therein.

2. The container of claim 1 wherein the adhesive layer is a polymer or resin having a solubility parameter in the range of about 8.5 to about 13.

3. The container of claim 1 wherein the adhesive layer consists essentially of an ECO, EAACO, EMAACO, or EVACO.

4. The container of claim 1 wherein the adhesive layer has thereon a primer coat of a vinyl resin, a urethane resin, an acrylic resin, an epoxy resin, a polyamide, a polyester, polycarbonate, or polyethylene terephthalate.

5. The container of claim 1 wherein the adhesive layer is activated by heat or corona discharge to obtain enhanced adhesion.

6. The container of claim 1 wherein the chloropolymer comprises a polymer of vinyl chloride and/or vinylidene chloride, including those containing a minor amount of at least one other copolymerizable olefin or vinyl compound.

7. The container of claim 1 wherein the chloropolymer comprises polyvinyl chloride, vinylidene chloride copolymer, or a copolymer of vinyl chloride and vinylidene chloride.

8. The container of claim 1 wherein the substrate is a material of the group comprising paper, paperboard, woven fabric, non-woven fabric, metal foil, metal mesh, plastic or resin sheet, plastic or resin mesh, and cellular plastic or resin.

9. The container of claim 1 wherein the substrate is paper or paperboard.

10. The container of claim 1 wherein there is an outer layer adhered to the substrate on the other side from the adhesive.

11. The container of claim 1 wherein there is an outer layer adhered to the substrate on the other side from the adhesive,
said outer layer being a material selected from the group comprising thermoplastic polymers, thermoplastic resins, thermosetting polymers, thermosetting resins, metal foil, paint, lacquer, and printed sheets.

12. The container of claim 1 wherein there is an outer layer adhered to the substrate on the other side from the adhesive,
said outer layer being a woven fabric, a non-woven fabric, a cellular plastic, or a cellular resin.

13. The container of claim 1 wherein the substrate is a multi-layer laminate comprising a main layer bonded on at least one of its surfaces to an auxiliary or filler layer.

14. The container of claim 1 wherein the substrate is a multi-layer laminate comprising a main layer of paper or paperboard bonded on at least one of its surfaces to an auxiliary or filler layer.

15. The container of claim 1 wherein the substrate is a multi-layer laminate comprising a main layer of metal foil, bonded on at least one of its surfaces with an auxiliary or filler layer.

16. The container of claim 1 wherein the substrate is a multi-layer laminate comprising a main layer of paper or paperboard bonded on both of its surfaces to auxiliary or filler layers.

17. The container of claim 1 wherein the substrate is a multi-layer laminate comprising a main layer of metal foil bonded on both of its surfaces to auxiliary or filler layers.

18. The container of claim 1 wherein the substrate comprises paper or paperboard,
the chloropolymer comprises a polymer of vinyl chloride and/or vinylidene chloride,
and the adhesive layer consists of ECO, EAACO, EMAACO, EVACO.

19. The container of claim 1 wherein the substrate is a multi-layer laminate comprising a main layer of paper or paperboard bonded on at least one of its surfaces to an auxiliary or filler layer,
the chloropolymer comprises a polymer of vinyl chloride and/or vinylidene chloride,
and the adhesive consists of ECO, EAACO, EVACO, EMAACO.

20. The container of claim 1 wherein the substrate is a multi-layer laminate comprising a main layer of paper or paperboard bonded on both of its surfaces to an auxiliary or filler layers,
the chloropolymer comprises a polymer of vinyl chloride and/or vinylidene chloride,
and the adhesive layer consists of ECO, EAACO, EMAACO, EVACO.

21. The container of claim 1 wherein the substrate is a multi-layer laminate comprising a main layer of metal foil bonded on at least one of its surfaces to an auxiliary or filler layer,
the chloropolymer comprises a polymer of vinyl chloride and/or vinylidene chloride,
and the adhesive layer consists of ECO, EAACO, EMAACO, EVACO.

22. The container of claim 1 wherein the substrate is a multi-layer laminate comprising a main layer of metal foil bonded on both of its surfaces to an auxiliary or filler layers,
the chloropolymer comprises a polymer of vinyl chloride and/or vinylidene chloride,
and the adhesive layer consists of ECO, EAACO, EMAACO, EVACO.

23. The container of claim 1 wherein the substrate comprises paper or paperboard, the chloropolymer comprises a vinylidene chloride polymer, and the adhesive consists of a RF-heatable thermoplastic interpolymer of ethylene having carbon monoxide copolymerized into the polymer chain.

24. The container of claim 1 wherein the substrate is a multi-layer laminate comprising a main layer of paper or paperboard bonded on one or both of its surfaces to auxiliary or filler layers,
the chloropolymer comprises a vinylidene chloride polymer,
and the adhesive consists of a RF-heatable thermoplastic interpolymer of ethylene having carbon monoxide copolymerized into the polymer chain.

25. The container of claim 1 wherein the substrate is a multi-layer laminate comprising a main layer of metal foil bonded on one or both of its surfaces to auxiliary or filler layers,
the chloropolymer comprises a vinylidene chloride polymer,
and the adhesive consists of a RF-heatable thermoplastic interpolymer of ethylene having carbon monoxide copolymerized into the polymer chain.

26. A container for enclosing foods, juice or beverages which contain essential oils and/or flavorings,
said container being constructed of a multi-ply structure comprising a substrate, an inner-wall barrier layer, an adhesive layer between, and binding, said substrate and said barrier layer, and an outer layer on said substrate on the other side from the adhesive layer,
said adhesive layer consisting essentially of a RF-heatable polymer of ethylene having carbon monoxide polymerized into the polymer chain, including those containing a minor amount of another copolymerizable olefin or vinyl compound such adhesive layer having a solubility parameter in the range of about 8 to about 14,
said barrier layer comprising a chloropolymer which restricts or substantially retards the passage or migration of the essential oils and/or flavorings from juices or beverages enclosed therein, and
said outer layer comprising a polymer or resin having a solubility parameter in the range of about 8 to about 14.

27. The container of claim 26 wherein the adhesive layer and the outer layer each have a solubility paramater in the range of about 8.5 to about 13.

28. The container of claim 26 wherein the adhesive layer consists essentially of an ECO, EAACO, EMAACO or EVACO.

29. The container of claim 26 wherein the adhesive layer has thereon a primer coat of a vinyl resin, a urethane resin, an acrylic resin, an epoxy resin, a polyamide, a polyester, polycarbonate, or polyethylene terephthalate.

30. The container of claim 26 wherein the adhesive layer is activated by heat or corona discharge to obtain enhanced adhesion.

31. The container of claim 26 wherein the chloropolymer comprises a polymer of vinyl chloride and/or vinylidene chloride, including those containing a minor amount of at least one other copolymerizable olefin or vinyl compound.

32. The container of claim 26 wherein the chloropolymer comprises polyvinyl chloride, vinylidene chloride copolymer, or a copolymer of vinyl chloride and vinylidene chloride.

33. The container of claim 26 wherein the substrate is a material of the group comprising paper, paperboard, woven fabric, non-woven fabric, metal foil, metal mesh, plastic or resin sheet, plastic or resin mesh, and cellular plastic or resin.

34. The container of claim 26 wherein the substrate is paper or paperboard.

35. The container of claim 26 wherein the said outer layer comprises
a woven fabric, a nonwoven fabric, a cellular plastic, a cellular resin, a thermoplastic polymer, a thermoplastic resin, a thermosetting polymer, a thermosetting resin, a metal foil, paint, lacquer, or printed sheet.

36. The container of claim 26 wherein the substrate is a multi-layer laminate comprising a main layer bonded on one or both of its surfaces to auxiliary or filler layers.

37. The container of claim 26 wherein the substrate is paper or paperboard,
the chloropolymer comprises a polymer of vinyl chloride and/or vinylidene chloride,
the adhesive consists essentially of a RF-heatable thermoplastic interpolymer of ethylene having carbon monoxide copolymerized into the polymer chain, and the outer layer comprises an RF-heatable thermoplastic interpolymer of ethylene having carbon monoxide copolymerized into the polymer chain.

38. The container of claim 26 wherein the substrate is a multi-layer laminate comprising a main layer of paper or paperboard bonded on one or both of its surfaces to auxiliary or filler layer(s),
the chloropolymer comprises a polymer of vinyl chloride and/or vinylidene chloride,
the adhesive consists essentially of a RF-heatable thermoplastic interpolymer of ethylene having carbon monoxide copolymerized into the polymer chain,
the auxiliary or filler layer(s) comprises thermoplastic polymer, thermosetting resin, woven fabric, non-woven fabric, or metal foil, and
the outer layer comprises a RF-heatable thermoplastic interpolymer of ethylene having carbon monoxide copolymerized into the polymer chain.

39. The container of claim 26 wherein the substrate comprises metal foil, thermoplastic polymer, thermosetting polymer, woven fabric, non-woven fabric, cellular plastic, or cellular resin, said substrate including those bonded on one or both sides with auxiliary or filler layer(s),
said auxiliary or filler layer(s) comprises metal foil, paper, thermoplastic polymer, thermosetting polymer, woven fabric, non-woven fabric, cellular plastic, or cellular resin, said auxiliary or filler layer(s) being dissimilar to said substrate,
the chloropolymer comprises a polymer of vinyl chloride and/or vinylidene chloride,
the adhesive consists of ECO, EAACO, or EVACO, and the outer layer comprises ECO, EAACO, EVACO, or EVA.

40. A container for enclosing foods, juices or beverages which contain essential oils and/or flavorings,
said container being constructed of a multi-ply structure comprising a substrate, an inner-wall barrier layer, an adhesive layer between, and binding, said substrate and said barrier layer,
said barrier layer comprising a halopolymer,
and said adhesive layer consisting of a RF-heatable thermoplastic interpolymer of ethylene having carbon monoxide copolymerized into the polymer chain.

41. The container of claim 40 wherein the halopolymer comprises a thermoplastic organic polymer having sufficient halogen groups to provide barrier properties to substantially inhibit or prevent the passage of essential oils and/or flavorings.

42. The container of claim 40 wherein the halopolymer comprises a polymer of vinyl halide, and/or vinylidene halide wherein the halide is chloride and/or fluoride.

43. The container of claim 40 wherein the halopolymer comprises a polymer of vinyl chloride and/or vinylidene chloride.

44. The container of claim 40 wherein the halopolymer comprises a polymer of vinylidene chloride.

45. The container of claim 40 wherein the adhesive layer consists of E/CO, E/CO/VA, E/CO/AA, or E/CO/MAA.

46. The container of claim 40 wherein the adhesive layer consists of E/CO/AA.

47. A container having enclosed therein a food, juice or beverage which contains essential oils and/or flavorings,
said container being constructed of a multi-ply structure comprising a substrate, an inner-wall barrier layer, and an adhesive layer between, and binding, said substrate and said barrier layer,
said adhesive layer consisting essentially of an ECO, EAACO, EMAACO, EVACO polymer or resin, such adhesive layer having a solubility parameter in the range of about 8 to about 14, and
said barrier layer comprising a halopolymer which restricts or substantially retards the passage or migration of the essential oils and/or flavorings from the food, juices or flavorings enclosed therein.

48. The container of claim 47 wherein the halopolymer barrier layer comprises a polymer of vinyl chloride and/or vinylidene chloride and the adhesive layer consists of a thermoplastic interpolymer of ethylene having carbon monoxide copolymerized into the polymer chain.

49. The container of claim 47 wherein the enclosed food comprises a dry cereal or baked goods.

50. The container of claim 47 wherein the enclosed juice comprises citrus juice.

51. The container of claim 47 wherein the enclosed juice comprises orange juice.

* * * * *

UNITED STATES PATENT AND TRADEMARK OFFICE
CERTIFICATE OF CORRECTION

PATENT NO. : 4,795,665

DATED : January 3, 1989

INVENTOR(S) : Gerald M. Lancaster; Morris S. Edmondson

It is certified that error appears in the above-identified patent and that said Letters Patent is hereby corrected as shown below:

First Page, under "Related U.S. Application Data"; change "654,990" to --654,900--.

First Page, under "ABSTRACT"; change "structrue" to --structure--.

Col. 2, line 4; change "esssential" to --essential--.

Col. 3, line 11; add --(OL); the filler layers and the outer layer-- after "outer layer,".

Col. 4, line 55; change "disperion" to --dispersion--.

Col. 5, line 59; change "to" to --at--.

Col. 8, line 15; add a comma --,-- after the word "flexible".

Col. 8, line 30; change "esthetic" to --asthetic--.

UNITED STATES PATENT AND TRADEMARK OFFICE
CERTIFICATE OF CORRECTION

PATENT NO. : 4,795,665

DATED : January 3, 1989

INVENTOR(S) : Gerald M. Lancaster; Morris S. Edmondson

It is certified that error appears in the above-identified patent and that said Letters Patent is hereby corrected as shown below:

Col. 8, line 30; change "scuff-resistence" to --scuff-resistance--.

Col. 8, line 49; delete --particle--.

Col. 8, line 50; change "the" between "of" and "Dow" to --The--.

Col. 9, line 9; delete "a" between "in" and "glass".

Col. 10, line 20; change "availabe" to --available--.

Col. 10, line 37; change "from" to --for--.

Col. 11, line 32; change "0.025" to --0.25 mm--.

Col. 11, line 65; delete "EVACO" from beginning of line.

Col. 13, line 8; change "EMAACO, EVACO" to --EMAACO, or EVACO--.

Col. 13, line 16; change "EVACO, EMAACO" to --EVACO, or EMAACO--.

Col. 13, line 18; delete "an" from sentence.

Col. 13, line 35; delete "an" from sentence

UNITED STATES PATENT AND TRADEMARK OFFICE
CERTIFICATE OF CORRECTION

PATENT NO. : 4,795,665

DATED : January 3, 1989

INVENTOR(S) : Gerald M. Lancaster; Morris S. Edmondson

It is certified that error appears in the above-identified patent and that said Letters Patent is hereby corrected as shown below:

Col. 13, line 40; change "EMAACO, EVACO" to --EMAACO, or EVACO--.

Col. 13, line 65; change "juice" to --juices--.

Col. 14, line 21; change "paramater" to --parameter--.

Col. 16, line 28; change "EMAACO, EVACO" to --EMAACO, or EVACO--.

Signed and Sealed this

Twenty-first Day of August, 1990

Attest:

HARRY F. MANBECK, JR.

*Attesting Officer*  *Commissioner of Patents and Trademarks*